Patented Apr. 10, 1923.

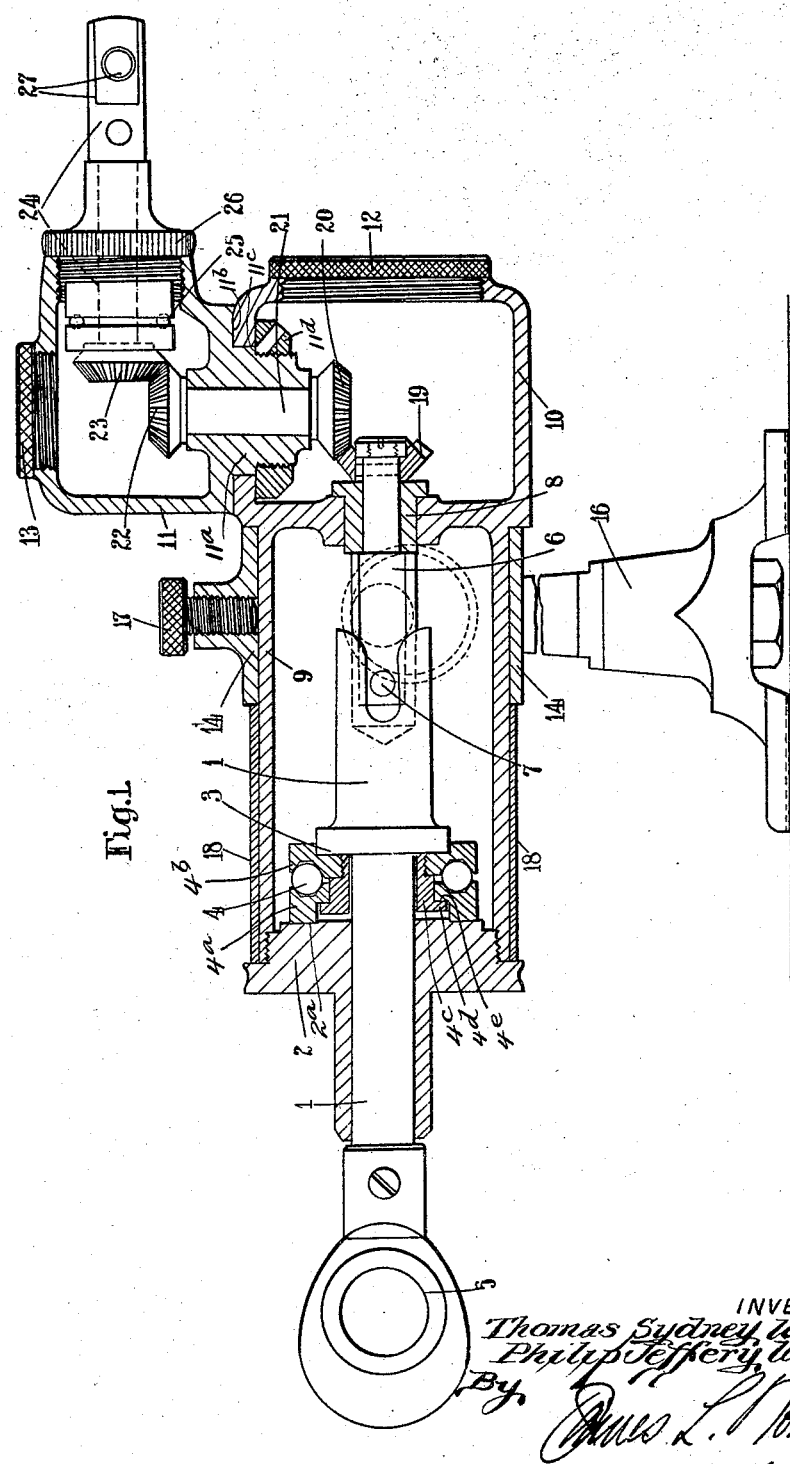

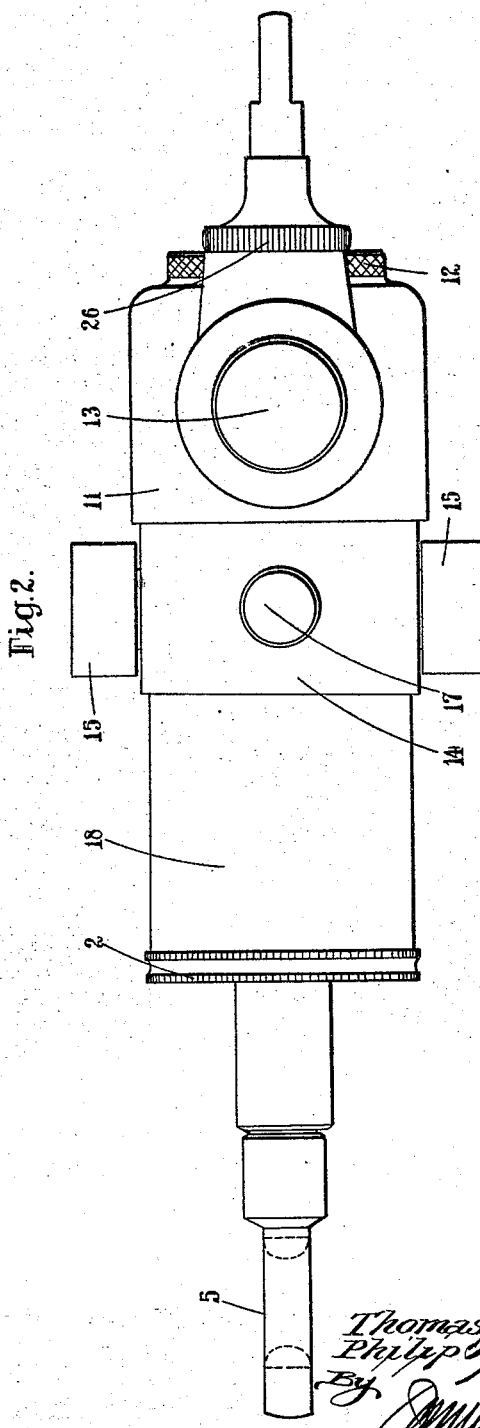

1,451,602

UNITED STATES PATENT OFFICE.

THOMAS SYDNEY WALKER AND PHILIP JEFFERY WALKER, OF BIRMINGHAM, ENGLAND.

SHIP'S LOG.

Application filed October 24, 1921. Serial No. 510,165.

*To all whom it may concern:*

Be it known that we, THOMAS SYDNEY WALKER and PHILIP JEFFERY WALKER, subjects of the King of Great Britain, residing at 58 Oxford Street, Birmingham, Warwickshire, England, have invented certain new and useful Improvements Relating to Ships' Logs, of which the following is a specification.

This invention relates to ships' logs and it has particular reference to the transmission apparatus whereby the revolutions of the rotator in the water are transmitted to the indicating mechanism, and the invention is directed particularly but not exclusively to that kind of ship's log apparatus which is "boomed out" from the side of the ship and in which bevel or other gearing contained in a swivelled casing connects the primary spindle to the spindle to which the flexible or other connection from the indicating mechanism is attached.

The invention has for its object an improved construction of transmission mechanism designed so as to transmit the motion of the rotator to the indicating mechanism whatever the position of the latter that is to say whether fore or aft of or at whatever angle to the "boom" carrying said transmission mechanism, and no matter at what part of the ship said transmission mechanism is located or from what part of the ship's side said "boom" is extended.

Accordingly, between the primary spindle and the spindle to which is attached the driving means for the indicating mechanism, there is interposed a train of gearing constructed in such a manner that one portion of the train is capable of bodily angular movement circumferentially of said primary spindle and the other portion of the train is capable of bodily angular movement in a plane at right angles or thereabouts to the plane of bodily angular movement of the first portion.

The aforesaid gearing may be either bevel gearing, worm and worm wheel gearing, or it may be spiral gearing, and in either case each angularly movable element is preferably, but not necessarily, totally enclosed.

One suitable form of the invention is illustrated by way of example in the accompanying drawings in which Figure 1 is a longitudinal section of the apparatus and Figure 2 is a top plan view.

1 is the primary spindle mounted in a bearing plate 2 which has a tubular extension to provide an adequate bearing surface for said spindle. The spindle 1 has a shoulder or collar 3 between which and said bearing plate 2 ball bearings 4 are located. The ball-bearings 4 comprise two annular members 4$^a$ and 4$^b$, the former being centered on the bearing plate by means of a shoulder 2$^a$ and the latter being recessed to receive the shoulder 3 of the spindle 1. The members 4$^a$ and 4$^b$ are secured together, preferably by an annular coupling 4$^c$ threaded at one end into a central aperture in the member 4$^b$ and having at its other end a flange 4$^d$ adapted to press against a cooperating shoulder 4$^e$ on the member 4$^a$.

At its outer extremity the primary spindle 1 is provided with the usual eye 5 or other equivalent means for attaching the rotator cord (not shown) thereto, and at its inner extremity said primary spindle is bifurcated or forked to slidably embrace and be coupled to an arbor 6 having a transverse pin 7 adapted to extend into said fork.

The arbor 6 is mounted in a bearing 8 carried by a tubular casing 9 to which is screwed the aforesaid bearing plate 2.

The casing 9 and bearing plate 2, enclose the primary spindle 1 and are angularly movable circumferentially thereof.

The casing 9 is extended forwardly of the bearing 8 so as to form a housing 10 for a portion of the gearing, and upon this lower housing 10 is mounted a second or upper housing 11 above one end of the casing 9 angularly movable relatively thereto; the plane of movement of said housing 11 being at right angles to or it may be slightly less or slightly greater than at right angles to, the plane of angular movement of the housing 10 which is capable of angular movement circumferentially of the primary spindle 1.

A milled cap 12 and a milled cap 13 encloses the housing 10 and the housing 11 respectively.

The casing 9 is mounted freely in a ring 14 having thereon trunnions 15, 15 whereby the ring 14 is carried on a bracket or pedestal 16 which is adapted to be secured to the boom, or to any other convenient support such as on the taffrail at the stern of the vessel, and a set-screw 17 carried on the ring 14 is adapted to bear on the casing 9 and to clamp same within the ring 14 in any desired position of adjustment circumferentially of the primary spindle 1.

18 is a tubular distance piece between the ring 14 and a shoulder on the bearing plate 2.

At the inner end of the arbor 6 there is keyed a bevel wheel 19 meshing with a bevel wheel 20 that is keyed to an intermediate arbor 21 which is carried in a bearing formed on the housing 11 and at the upper end of said intermediate arbor is keyed a bevel wheel 22 which is located within the upper housing 11 and which meshes with a bevel wheel 23 keyed upon the inner extremity of a spindle 24 which spindle is adapted to be connected by a cord (not shown) so as to drive the indicating mechanism said spindle 24 being mounted in ball bearings 25 carried by, so as to move angularly with, the upper housing 11. A milled gland 26 screws into the casing 11 and carries the spindle 24 which has at its outer extremity an eye 27 or other equivalent means for connecting the driving cord thereto.

It will be observed that the housings 10 and 11 totally enclose the gearing 19, 20, 22 and 23 enabling it to be run in a permanent supply of lubricant and protecting it completely from any detrimental effects of sea water or atmosphere, The housing 11 is provided with a depending tubular extension 11$^a$ which is reduced in diameter to form a shoulder 11$^b$ and further reduced to form a shoulder 11$^c$, the extension beyond the shoulder 11$^c$ being threaded to receive a nut 11$^d$ whereby the housing 11 may be swivelly connected to the housing 10.

Instead of the housing 10 being formed in one with the casing surrounding the primary spindle the housing might be arranged so as to be movable relatively thereto.

By means of the construction described each housing and its corresponding gear element is capable of angular movement in such a manner that the transmission mechanism is rendered adjustable and can therefore transmit to the indicating mechanism the revolution of the rotator at almost any angle that may be dictated by the location of the separate parts of the log apparatus about the ship, or as may be required by different designs or classes of ships, and thus the adaptability of the transmission is greatly increased.

From the above description it will be understood that the device is particularly adapted for use at sea or at any place where a tool shop or a skilled mechanic is not available. The bearing plate 2 being in threaded connection with the end of the tubular member 9, the caps 12 and 13 being removable, the connection between the housing 11 and the housing 10 being detachable, and the arbor 6 having slidable connection with the primary spindle 1, the apparatus may be easily taken apart by an unskilled workman and the parts and connections may be easily reached for cleaning, renewal, or repair.

What we claim is:—

1. An apparatus for transmitting the movement of a rotor to the indicating mechanism of a slip's log comprising a supporting structure mounted for universal movement, said supporting structure having an intermedite apertured web, a bearing in said aperture, an arbor rotatably mounted in said bearing, a bearing plate removably secured at one end of said supporting structure, said bearing plate being apertured coaxially with said web, a primary spindle carried by said bearing plate, said spindle being forked to slidably embrace said arbor, a pin extending at right angles from said arbor and adapted to ride between said forks, a secondary supporting structure removably secured to said first-named supporting structure, and spindles mounted in said secondary structure in driving connection with said arbor.

2. An apparatus for transmitting the movement of a rotor to indicating mechanism comprising a supporting structure having a removable bearing plate at one end, a stationary bearing intermediate of the ends of said structure, an arbor rotatably mounted in said bearing, a primary spindle rotatably mounted in said bearing plate, a slidable driving connection between said arbor and spindle, and a secondary supporting structure swiveled to said first-named supporting structure and removably connected therewith.

3. In combination with a slip's log, means for transmitting the motion of the rotor to an indicating mechanism comprising a casing having a plurality of compartments therein open at their ends, a secondary housing swiveled to and removably connected with one of said compartments, an apertured bearing plate closing the opening of one compartment of the casing and a cap closing the opening in the other compartment, said secondary compartment having therein an aperture and a removable closure for said aperture, a spindle rotatably extending through the aperture of said bearing plate, an arbor having sliding connection with the spindle and rotatably mounted in said casing, a second arbor rotatably mounted in said secondary housing, a spindle rotatably mounted in said secondary housing, driving connection between said arbors and spindles, a bearing centered upon said bearing plate and surrounding said first-named spindle, said bearing having raceways, one of which is recessed, a shoulder on said spindle adapted to to be received in said recess, and means for securing said raceways together.

In testimony whereof we have hereunto set our hands in presence of two subscribing witnesses.

THOMAS SYDNEY WALKER.
PHILIP JEFFERY WALKER.

Witnesses:
ALBERT JAMES HITCHINSON,
HOWARD WALTER WEBB.